(12) United States Patent
Foltin

(10) Patent No.: US 9,250,063 B2
(45) Date of Patent: Feb. 2, 2016

(54) METHOD AND DEVICE FOR ASCERTAINING A POSITION OF AN OBJECT IN THE SURROUNDINGS OF A VEHICLE

(75) Inventor: Johannes Foltin, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/352,738

(22) PCT Filed: Aug. 28, 2012

(86) PCT No.: PCT/EP2012/066634
§ 371 (c)(1),
(2), (4) Date: Aug. 4, 2014

(87) PCT Pub. No.: WO2013/056883
PCT Pub. Date: Apr. 25, 2013

(65) Prior Publication Data
US 2014/0379218 A1  Dec. 25, 2014

(30) Foreign Application Priority Data
Oct. 19, 2011  (DE) .......................... 10 2011 084 762

(51) Int. Cl.
*G06F 7/00* (2006.01)
*G08G 1/017* (2006.01)
*H01L 27/00* (2006.01)
*G01B 11/14* (2006.01)
*B60Q 1/08* (2006.01)
*G06K 9/00* (2006.01)
*G06T 7/00* (2006.01)
*B60W 10/18* (2012.01)
*B60W 10/20* (2006.01)

(52) U.S. Cl.
CPC ............... *G01B 11/14* (2013.01); *B60Q 1/085* (2013.01); *B60W 10/18* (2013.01); *B60W 10/20* (2013.01); *G06K 9/00805* (2013.01); *G06T 7/0042* (2013.01); *B60Q 2300/33* (2013.01); *B60Q 2300/45* (2013.01); *G06T 2207/30261* (2013.01)

(58) Field of Classification Search
USPC ........................... 701/41; 340/937; 250/208.1
See application file for complete search history.

(56) References Cited

U.S. PATENT DOCUMENTS

| | | | |
|---|---|---|---|
| 2004/0016870 A1* | 1/2004 | Pawlicki et al. ............ | 250/208.1 |
| 2004/0201483 A1* | 10/2004 | Stam et al. .................... | 340/600 |
| 2007/0154063 A1* | 7/2007 | Breed .......................... | 382/100 |
| 2008/0030374 A1* | 2/2008 | Kumon et al. ................ | 340/937 |
| 2008/0055114 A1* | 3/2008 | Kim et al. .................... | 340/937 |
| 2009/0045323 A1* | 2/2009 | Lu et al. ....................... | 250/208.1 |
| 2012/0050074 A1* | 3/2012 | Bechtel et al. ................ | 340/988 |
| 2012/0170808 A1 | 7/2012 | Ogata et al. | |
| 2012/0300074 A1* | 11/2012 | Hasegawa ..................... | 348/148 |
| 2014/0232872 A1* | 8/2014 | Kussel .......................... | 348/148 |
| 2014/0379218 A1* | 12/2014 | Foltin ............................ | 701/41 |

FOREIGN PATENT DOCUMENTS

| | | |
|---|---|---|
| DE | 196 03 267 | 7/1997 |
| DE | 10 2007 034196 | 1/2009 |
| WO | 2011/036936 | 3/2011 |

* cited by examiner

*Primary Examiner* — Thomas G Black
*Assistant Examiner* — Tyler Paige
(74) *Attorney, Agent, or Firm* — Kenyon & Kenyon LLP

(57) ABSTRACT

A method for ascertaining a position of an object in surroundings of a vehicle. The method includes a step of input of a light signal from an optical sensor, the light signal representing a brightness, a degree of reflection of light emitted by a headlight of the vehicle from an object, and/or a sharpness of a boundary line of the object illuminated by light from a headlight. Furthermore, the method includes determining a distance of the object from the vehicle by using the light signal to determine the position of the object in the surroundings of the vehicle.

16 Claims, 2 Drawing Sheets

METHOD AND DEVICE FOR ASCERTAINING A POSITION OF AN OBJECT IN THE SURROUNDINGS OF A VEHICLE

FIELD OF THE INVENTION

The present invention relates to a method for ascertaining a position of an object in the surroundings of a vehicle, a corresponding device as well as a corresponding computer program product.

BACKGROUND INFORMATION

When activating motor vehicle headlights, one should know whether or not a road is separated from the opposite lane by a structural separation. The specific light distribution of "highway light" is activated only at the moment when a certain speed threshold is exceeded. Legislators also allow highway lights to come on when a structural separation has been detected.

For headlight activating algorithms, it is important to know whether or not there is a structural separation: in the case of a structural separation, the headlights of other vehicles are often not discernible, so that the system is switched to high beams and there may thus be glare.

Navigation information may thus be utilized appropriately to detect a highway (or a structural separation, if necessary) but permanently installed navigation systems are often not present in vehicles of the lower price segment. A navigation system fails due to the problem of updating the map material in construction areas where there is a structural separation by concrete walls.

There are situations in which a distance measurement is appropriate. In addition to an assistant for transverse guiding (e.g., at construction sites, in parking garages), there are also assistants for longitudinal guiding (e.g., during parking, braking with (video) ACC to a standstill). Navigation systems cannot be used with the longitudinal and transverse guiding tasks mentioned above because of insufficient map data and/or precision of the GPS signals.

Parking aids are implemented at the present by ultrasonic sensors. Parking systems are expensive—although they only emit a warning sound through the music system. There are retrofitting systems, but those are also associated with increased costs. Parking assist systems are often installed only at the rear since drivers have better vision forward than rearward.

German patent document DE 10 2007 034 196 A1 discusses a method for lane detection having a driver assistance system, which includes a sensor system for lane detection in which measuring points representing lane markings are detected with the sensor system for lane detection in a region of traffic space ahead of the vehicle. An ideal number of measuring points MP is ascertained based on a reference model. A plausibility measure of the forward viewing range is determined from a comparison between the number of actually detected measuring points and the ideal number of measuring points.

SUMMARY OF THE INVENTION

Against this background, a method and a control unit using this method, and finally, a corresponding computer program product according to the descriptions herein are provided with the present invention. Advantageous embodiments are derived from the subclaims and the following description.

The present invention creates a method for ascertaining a position of an object in the surroundings of a vehicle, the method including the following steps:
    inputting a light signal from an optical sensor, the light signal representing
        a brightness,
        a degree of reflection of light emitted by a headlight of the vehicle from an object and/or
        a sharpness of a boundary line of the object illuminated by the light from the headlight; and
    determining the distance of the object from the vehicle using the light signal to determine the position of the object in the surroundings of the vehicle.

The present invention also creates a device which is configured to carry out or implement the steps of the method according to the present invention in corresponding equipment. The object on which the present invention is based may also be achieved rapidly and efficiently through this embodiment variant of the present invention in the form of a device.

In particular, the present invention creates a device for ascertaining a position of an object in the surroundings of a vehicle, this device including the following features:
    an interface for inputting a light signal from an optical sensor, the light signal representing
        a brightness,
        a degree of reflection of light emitted by a headlight of the vehicle from an object and/or
        a sharpness of a boundary line of the object illuminated by light from the headlight; and
    a unit for determining a distance of the object from the vehicle using the light signal to determine the position of the object in the surroundings of the vehicle.

A device may be understood in the present case to be an electric device, which processes sensor signals and outputs control signals as a function thereof. The device may have an interface, which may be implemented as hardware and/or software. In the case of a hardware configuration, the interfaces may be part of a so-called system ASIC, for example, which includes a wide variety of functions of the device. However, it is also possible that the interfaces are self-contained integrated circuits or are made up of discrete components, at least partially. In the case of a software configuration, the interfaces may be software modules, which are present on a microcontroller in addition to other software modules, for example.

A computer program product having program code is also advantageous, which may be stored on a machine-readable medium, such as a semiconductor memory, a hard drive memory or an optical memory and used to carry out the method according to one of the specific embodiments described above, when the program is executed on a computer or a device.

The position of an object in the surroundings of a vehicle may be understood to be the location (geographic, for example) of the object or a part of the object with respect to the vehicle, in particular the distance of the object and/or the part of the object from the vehicle and/or a direction of the object or of the part of the object from the vehicle. An optical sensor may be understood to be a unit for recording images and evaluating at least a portion of the electromagnetic range, which is visible to the human eye. Regions of the electromagnetic spectrum not visible for the human eye may also be detected by the optical sensor. These spectral components may also be evaluated using the additional components of the device presented here or using the steps of the method presented here. Semiconductors are in general more sensitive in the infrared range (IR range). An attempt may be made to remove this range by using an IR filter, but it is usually impossible to remove the entire nonvisual (invisible) range and therefore it is also included in the evaluation. The sharpness of a boundary line of a region of an object illuminated with light from the headlight may be understood to be a width and/or a structure of a transition from a lighter region of the object, illuminated by light from the vehicle's headlight and to a darker region, which is not illuminated by light from the vehicle's headlight.

The present invention is based on the finding that by utilizing the physical laws of optics, in particular with respect to reducing the brightness or the contrast with an increase in distance from the object to the vehicle, it is possible to ascertain this distance without any specially configured sensors such as, for example, radar sensors or ultrasonic sensors. Instead, the camera, which is frequently already installed in vehicles as standard, for example, is able to determine the distance of the object or a part of the object. The present invention thus offers the advantage that a sensor element, which is already present for other functions, may be used for an additional function, so that a separate sensor, which is provided specifically for the implementation of this additional function, for example, may be omitted. This reduces the cost of manufacturing a system for providing the functions mentioned above.

It is advantageous in particular if an angle at which the light signal has been detected with respect to an alignment of the vehicle is also input in the input step, so that the position of the object is also determined in the determination step by using that angle. Such a specific embodiment of the present invention offers the advantage of a very precise and accurate determination of the position of the object or of the part of the object.

To obtain a good spatial estimate of the location of the object with respect to the vehicle in particular, the distance and/or the direction of multiple subregions of the object with respect to the vehicle is/are ascertainable. Therefore, according to a favorable specific embodiment of the present invention, an additional light signal may be input by the optical sensor in the input step, representing a brightness, a degree of reflection of light; this additional light signal represents a brightness, a degree of reflection of light, emitted by the headlight of the vehicle from the object, or a sharpness of the boundary line of the object illuminated by light from the headlight of the vehicle, so that the additional light signal is detected from a location on the object other than the light signal and a spatial image of the object is determined in the determination step by using the light signal and the additional light signal.

To improve driving safety in driving a vehicle, according to a favorable specific embodiment of the present invention, a step of detection of a structural infrastructure measure may be provided when the distance from the object in the determination step is smaller than a predetermined safety margin (in particular when driving the vehicle). A structural infrastructure measure may be understood to be a partition or a guard rail, for example, between two lanes (in particular with traffic in opposite directions of travel) on a multilane road such as a highway, for example. In addition, a structural infrastructure measure may also be understood to be a reflector post (unlighted) at the edge of the lane, which reflects the light of the headlight, an elevated curb at the edge of the road or a wall near the vehicle, for example, in front of, behind or at the side of the vehicle. Such a specific embodiment of the present invention offers the advantage that a conclusion may be drawn from the detection of the position of the object regarding the path of the object with respect to the direction of travel, so that the presence of this structural separation may be used further for other functions of the vehicle. The distance from an object thereby ascertained may likewise be used further by other functions of the vehicle.

Detection of the structural infrastructure measure may be utilized to activate a special light distribution for highway light. It is possible in particular to adjust parameters for high beam assistants.

In the case of a traditional high beam assistant, which switches between low beams and high beams, the time for turning up the headlights to high beams may be changed, in particular prolonged, on detection of a structural separation. This has the advantage that the time for detection of other vehicles, which are difficult to detect due to the structural separation, is prolonged, thus making it unnecessary to turn up the headlights to high beams in the presence of another unrecognized road user. In addition to preventing glare, this system has a smoother performance, which is more pleasant for the driver than a hectic performance which may be disturbing for the driver.

For example, detection of a structural infrastructure measure may be utilized with the functions of lane departure warning and lane holding assistant. When the lateral distance from the particular object is too small, a warning signal, which may be visual, acoustic or haptic, may be generated. Alternatively or additionally, there may be intervention in the vehicle, so that a collision is prevented by maintaining a minimum distance or at least the intensity of the collision is reduced and/or the collision angle becomes flatter. The functions of lane departure warning and lane holding assistant are normally based on information from the lane markings. If the lane marking is absent or if it is supplementary to the lane information from the lane marking, the present invention may advantageously be utilized to warn the driver or to protect him from a collision with a structural infrastructure measure. Thus, for example, at construction sites where lanes are separated in part by structural infrastructure measures, the driver may be supported in driving his vehicle even in the absence of a lane marking.

In the urban area, the edge of a road is often delimited by curbs, in some cases without lane markings. By detecting the distance from the curb, the driver may also be supported by a lane departure warning or lane holding assistant even in this situation, which would no longer be possible in the case of exclusively lane-based assistants in the absence of lane markings.

When a vehicles parks on the edge of the road and thereby covers the lane marking or when no lane marking is provided, the driver may nevertheless be supported with the present invention. The distance from other vehicles may be ascertained based on the brightness of the light on these vehicles and the drivable range on which the driver is able to move his vehicle may thus be estimated. The driver may also be supported with the present invention through warnings and interventions into the functions of lane departure warning and lane holding assistant even in this situation.

In parking situations, in which the driver is restricted laterally, for example, in a garage or in a parking lot having lateral boundaries in the form of buildings, vegetation or other vehicles, the light signals may be evaluated to ascertain the distance from the obstacles. In this way, the driver may be supported in parking by warnings and interventions into vehicle operation, as a function of the ascertained distance, or the vehicle may be parked autonomously.

In additional functions, the distance from objects may be supported in the direction of travel to warn the driver of a collision with the object before it occurs or to intervene in the vehicle.

In particular through the present invention, the driver may be supported in parking or maneuvering, so that the driver is warned when the distance from an object such as a wall or another vehicle becomes less than a predetermined threshold. Alternatively or in addition to a warning, there may be an intervention into operation of the vehicle, as a function of the ascertained distance. The present invention also permits autonomous parking and maneuvering in the low-speed range in particular, in addition to supporting the driver.

It is also possible to ascertain the distance from other vehicles. In addition to ascertaining the distance from stationary vehicles, additionally or alternatively, the distance from other vehicles and, derived from that, the change in distance from other vehicles may also be ascertained. It is thus possible to follow another vehicle at a certain distance and to respond to its changes in speed, which are reflected in a change in the distance and reflected in the change in distance. A reaction may include, for example, generating an acoustic, visual or haptic warning signal, and additionally or alternatively may include intervention in operation of the vehicle. The use of the present invention may contribute toward traffic safety in particular in the low-speed range and at a short distance. For example, it is possible to follow another vehicle in a parking garage, or the speed and the distance from an intersection, a traffic light or, in a traffic jam, may be adapted to a preceding vehicle.

An object may be understood to be, for example, a structural infrastructure measure, a guard rail, a partition, concrete walls (or lateral boundaries in general), a wall, a curb, guide posts and boundary posts, bushes and trees as well as other (which may be parking) vehicles.

It is particularly advantageous if in the detection step, the structural infrastructure measure is detected when a region in the direction of travel ahead of the vehicle has a greater brightness than would be expected in the absence of the structural infrastructure measure. Such a specific embodiment of the present invention offers the advantage of utilizing the physical laws with respect to the light emission and reflection for particularly reliable detection of the position of structural infrastructure measures.

Furthermore, it is possible to make use of the fact that in the event of reflection of light on an object, this light is not only reflected back to the optical sensor but is also reflected into the immediate surroundings of the object, for example, onto the road surface there, which therefore has a greater brightness than would have been expected in the absence of the object. Therefore, according to one specific embodiment of the present invention, the structural infrastructure measure may be detected as being situated on the side of the vehicle, where, according to one specific embodiment of the present invention, a region having a greater brightness than expected has been detected in the detection step.

To be able to carry out an adaption of an automatic light regulation, for example, which adapts the light to the particular road conditions and thus also as a function of a detected structural infrastructure measure accordingly, a step of adapting an emission of light from the headlight of the vehicle, for example, switching to a special highway light distribution and/or a light emission parameter for the emission of light from the headlight of the vehicle, for example, the waiting time until switching from low-beam light to high beams may be provided according to one specific embodiment of the present invention when the structural infrastructure measure has been detected in the detection step.

According to one specific embodiment of the present invention, which is particularly favorable, before the input step, a step of triggering a movement of at least one headlight may be carried out, the triggering being carried out in such a way that an emission of light from the headlight of the vehicle and/or of a light emission parameter for emission of light from the headlight of the vehicle is altered in such a way that the light emission is pivoted in a direction running essentially across the direction of travel of the vehicle. An input step may also be carried out before and after each triggering step, so that a very precise and simple analysis of the surroundings around the vehicle is possible by evaluating the light signal before and after the triggering. The pivoting of the headlights or more generally the light emission takes place to permit a more precise measurement. The pivoting may be understood to be like a search light for discovering or better measuring the object. For example, the headlight could be pivoted in intervals without needing to detect a structural separation, for example, in addition to the other estimation of the presence of a structural separation without pivoting. The pivoting of the headlights may be utilized for a plausibility check in detection of a structural separation. The pivoting may be utilized for detection of objects themselves, for example, when the probability of a structural separation is high. This may mean that the headlights may be pivoted even before the structural infrastructure measure has been detected. However, the adaption of the light emission described above may be understood as switching to the "highway light" light distribution, whereas pivoting of the headlights takes place to ascertain the presence of a structural separation. The headlights are thus pivoted to obtain more accurate measured data for the measurement. Such a specific embodiment of the present invention offers the advantage of a precise option, which is carried out quickly, for detection of objects in the detection range of an optical sensor.

For example, if a driver would like to park the vehicle in an underground garage, then the wall of the underground garage may be detected by the vehicle's headlights and evaluated as the object. To be able to now use the proposed approach as a parking aid, according to one specific embodiment of the present invention, an output step of a warning signal may be provided if the determined distance is less than the warning distance. This warning signal may be a visual, acoustic, haptic or other signal which gives the driver a suggestion as to the distance, a decreasing distance from the vehicle to the object or that the distance between the vehicle and the object is too small. Alternatively or additionally, a (partially) automatic parking may be carried out by decelerating at a wall, for example. The intervention occurs when the distance is less than a predetermined intervention distance.

Consequently, one specific embodiment of the present invention in which an intervention step into a driver assistance system in the control of the vehicle in response to the determined distance of the object from the vehicle is provided, in particular an intervention taking place into a lane holding assistant, into an assistance system for maintaining a distance from a preceding vehicle, into an assistance system for monitoring a lateral approach to a boundary, into a brake assistance system and/or into a parking assistance system as a driver assistance system in response to the certain distance of the object from the vehicle. In this way, the determined distance of the object from the vehicle may also be used by other assistance systems in the vehicle, which permits a high additional benefit, although it is achieved with only very low additional cost.

If the vehicle is next to an object and the ascertained distance is less than a predetermined intervention distance, then the vehicle may be protected by an intervention into the vehicle, for example, through the steering or the brakes, before coming into contact with the infrastructure measure, and/or the severity of the contact may be diminished.

The present invention is explained in greater detail below on the basis of the accompanying drawings as an example.

DETAILED DESCRIPTION

Figure 1:
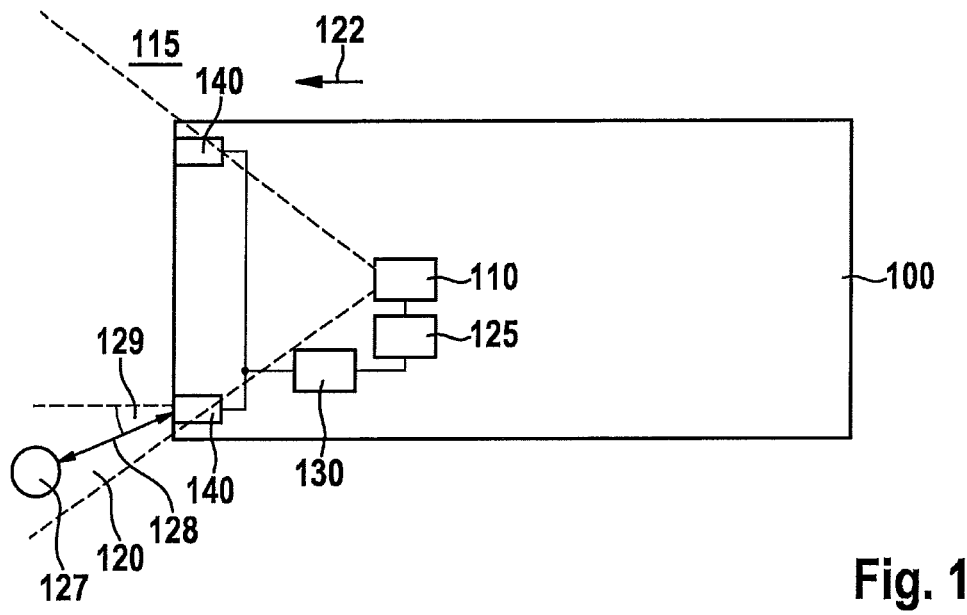
FIG. 1 shows a block diagram of a vehicle in which one exemplary embodiment of the present invention is used.

In the following description of exemplary embodiments of the present invention, the same or similar reference numerals are used for the elements having similar effects, which are illustrated in the various figures, so these elements will not be described repeatedly.

FIG. 1 shows a block diagram of a vehicle 100 having a camera 110 to monitor surroundings 115 of a vehicle, in particular in a field of view 120 of camera 110 in the direction of travel 122. Camera 110 thereby generates a camera image, which is transferred to an evaluation unit 125. Objects 127 from the camera image are detected in evaluation unit 125 and extracted, as explained in greater detail below. Furthermore, a distance 128 (for example, a lateral distance) of object 127 from vehicle 100 and/or an angle 129 of the object from a longitudinal axis of the vehicle may be ascertained. In evaluation unit 125, a structural separation between a lane in which the host vehicle 100 is traveling and a lane of oncoming traffic may be deduced if ascertained distance 128 is less than a threshold value. In this case, a signal may be output to a headlight control 130, which regulates vehicle headlights 140. For example, in the case of a structural separation between the two lanes as objects 127 recognized as present through the approach described above, a period of time for automatically switching from low beams to high beams or in general between different light emission characteristics may be lengthened. It may hereby prevented, for example, that a number of objects 127, which represent the fins of a glare prevention device, cause the light emission by headlights of the host vehicle 100 to be altered immediately after passing by one of these fins, so that a driver of an oncoming vehicle might be blinded. If switching immediately from low beams to high beams when the light object is no longer detected and if the light object were to emerge again, for example, behind another fin as a structural separation 127, this would also cause a very rapid adaption of the light distribution such as, for example, switching back and forth between low beam and high beam, which would actually be very unpleasant for the driver of the host vehicle and would thus be perceived as problematical.

Figure 2:
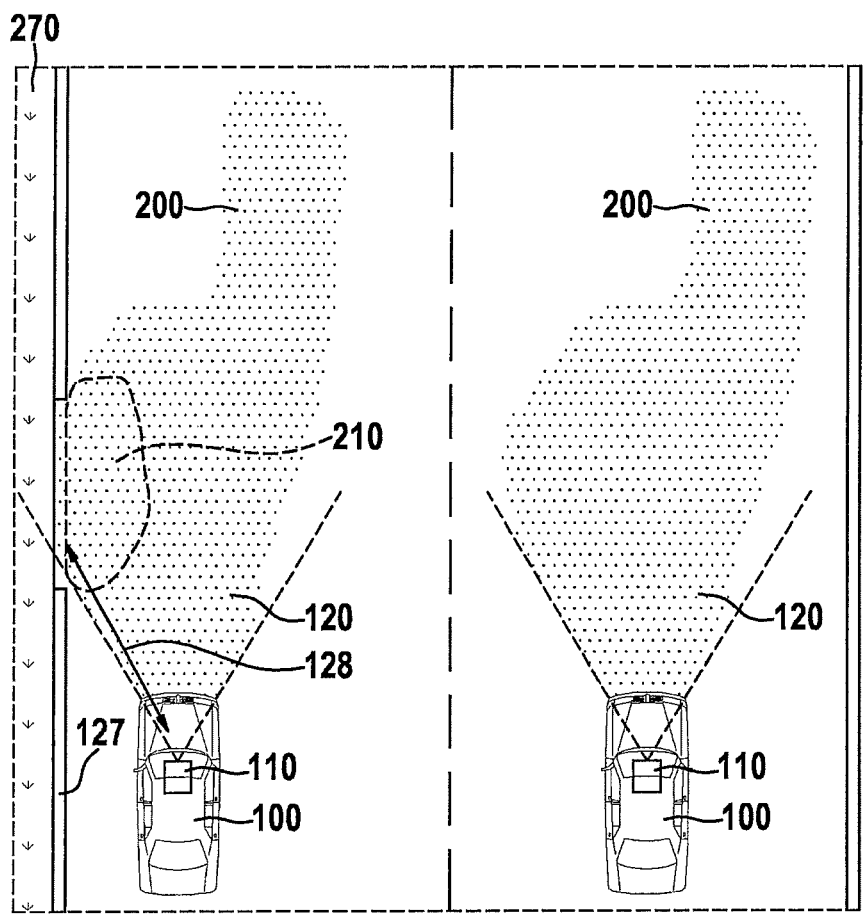
FIG. 2 shows a schematic diagram of one additional exemplary embodiment for detection of a structural separation due to differing brightnesses in the image of an illumination range detected ahead of the host vehicle.

Determination of the distance of object 127 from the vehicle is explained below in the example of detection of an existing structural separation 127 on roads due to the evaluation of the brightness of the light from the headlight reflected on the object 127. Camera 110 which is installed in vehicle 100 takes images from direction of travel 122. The camera control unit or evaluation unit 125 knows the light distribution of the headlights as shown in FIG. 2, for example. FIG. 2 shows a schematic illustration for detection of structural separation based on differences in brightness in the camera image, illustrating in the diagram on the left in FIG. 2 an illumination region 200 ahead of the host vehicle 100 in the presence of a structural separation 127 between lanes of different directions of travel, and the diagram on the right shows an illumination region 200, when there is no structural separation 127. Structural separation 127 may be an elevation from the road surface such as a guard rail, for example, a concrete wall (also at a construction site) or the like. The law of the square of the distance holds for light, i.e., the brightness decreases with the square of the distance.

Camera 110 estimates the degree of reflection (i.e., the "color" and/or the "brightness") of one or multiple objects 127 of interest (e.g., a guard rail) to vehicle 100 and determines distance 128 from the measured gray value together with the degree of reflection via the light emitted from headlights 140, and angle 129 may also be ascertained and used to estimate the precise position of object 127 from vehicle 100. If the object is large, a spatial detection of object 127 with respect to the vehicle may also take place. For example, multiple different positions of subregions of object 127 may be determined in the manner described above and then the extent and location of large object 127 may be inferred from these determined positions. It is thus possible to attempt to generate a "3D map" of the brightness values ahead of vehicle 100 and thereby detect the extent and location of object 127 ahead of or next to vehicle 100. Alternatively, reflection of the light from structural separation 270 to the road surface in a region 210 ahead of vehicle 100 may also be ascertained and compared with a stored (i.e., expected) brightness in the absence of structural separation 127. In this way, the position of object 127 and the increase in brightness thereby induced may be detected in the immediate vicinity of object 127.

Elevated objects 127 such as guard rails or concrete walls (or lateral boundaries in general) may be detected in this way, since light which would not otherwise strike the ground or would strike the ground only at a very great distance is able to strike this structural separation.

If a structural separation is detected via the estimated distance of the light reflection, the "highway light" function may be activated and/or other parameters for a debouncing strategy may be adapted (for example, definitely longer debouncing times may be set because of poorly detectable vehicles).

Figure 3:
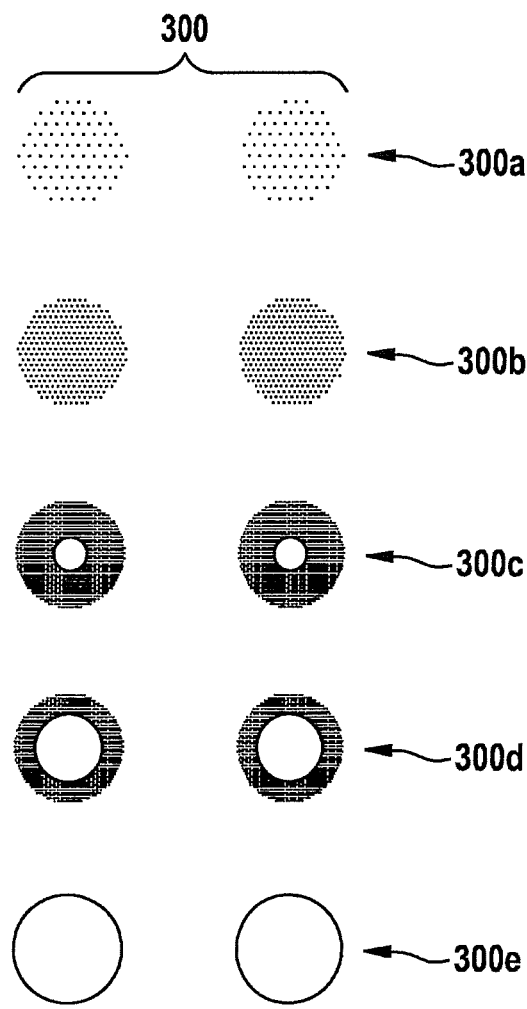
FIG. 3 shows a diagram of a pair of headlights as the light object, illustrating the differing sharpness and brightness during an approach of the pair of headlights to an observer.

Alternatively or additionally, the brightness and/or sharpness of the imaging of light from headlights (also referred to as "hot spots" which describes in particular the brightest region of the headlight on a vertical measurement screen) may also be utilized. During longitudinal guiding of a vehicle 100 or during determination of the distance from an object 127, it is also possible to utilize the fact, in addition to the brightness of the illuminated objects, that the light distribution in the region of the optical axis is brightest (which is also referred to as a "hot spot" effect). These hot spots are always imaged more sharply on an object (for example, a wall in a camera image) the closer the object moves to the plane of observation. FIG. 3 shows several diagrams of such lighter regions at different distances, these lighter regions being formed by reflection of light of a headlight of vehicle 100 on an object 127. Diagram 300a at the top shows a pair of headlights 400 representing a reflection of light of the vehicle's headlight from an object 127 at a great distance where the sharpness is very low. Sharpness may be referred to as a size (or width) or structure of a transition region between a light region (illuminated by the headlights of the vehicle) and a dark region of the image, the sharpness being greater, the smaller this transition region. Diagrams 300b through 300e of headlight pair 300, shown below diagram 300a at the top of FIG. 3, illustrate the increasing sharpness in the representation of the pair of headlights during an approach of the pair of headlights to the observer or a camera recording headlight pair 300. According to the diagram from FIG. 3, the hot spots are imaged with differing sharpness, depending on the distance from the observer.

By evaluating the sharpness of the imaging and/or the brightness of the hot spots, it is possible to deduce the distance of the illuminated elevated objects, and the driver may be warned, if necessary, for example, in conjunction with a simple parking assistant in the forward direction or to support a (partially) automatic parking assistant or in a targeted braking to a standstill in the case of (video) ACC (ACC=automatic cruise control), for example, or the distance may be used to determine the lateral distance of an oncoming vehicle. By pivoting one or multiple headlights, as is customary with a bending light system, the position of the hot spots may be varied, which has a positive effect on the detection performance. The pivoting is carried out in support of the detection step which need not be a function for adapting the light distribution for the driver. The pivoting may thus be understood differently than from an embodiment variant of the adaption step of the light distribution after a structural separation has been detected. In particular the pivoting may be understood as part of the detection step, so that the pivoting does not depend on the presence of a (detected) structural separation. It is then very easy to deduce the presence of a structural separation between two lanes in this way. In addition to fixed assumed reflection properties of the structural separation, the reflection property of the structural separation may also be estimated based on a model, in particular when the distance from the elevated object (wall, structural separation) changes.

The change in the light distribution, in particular the pivoting of at least one headlight, may be utilized to bring the hot spots to a position which is more favorable for ascertaining the distance. Thus in particular, even in the case of a lateral structural infrastructure measure such as, for example, a structural separation, the hot spot of at least one headlight may be projected onto the infrastructure measure. On the basis of the sharpness of the imaging of the hot spot, it is then again possible to ascertain the distance from the reflection or the structural infrastructure measure.

The change in the light distribution, in particular the pivoting of at least one headlight, causes a change in the brightness of the light in one direction from the vehicle. The quantity of reflected light changes in proportion to the change in the brightness of the light. The extent of the degree of reflection, which indicates how much light is reflected, is crucial for the change in brightness. The photometric inverse square law describes the dependence of the quantity of light on the square of the distance. By comparing the quantity of light reflected before and after a change in the light distribution, it is possible to improve upon ascertaining the distance as well as the accuracy in the estimation of the degree of reflection.

An increase in the reflected light due to a change in the light distribution, for example, due to pivoting of at least one headlight, has a positive effect on ascertaining the distance since the influence of the measuring inaccuracy may be reduced by the larger quantity of reflected light.

The distance may be ascertained more accurately due to the change in the light distribution, in particular the pivoting of at least one headlight, so the driver may be supported better on the whole.

Furthermore, a possible expansion may be achieved by evaluating the image of a rearview backup camera on a homogeneous wall based on the back reflection characteristic of the brake lights or of only one of the brake lights (for example, the third brake light) to measure a distance.

Figure 4:
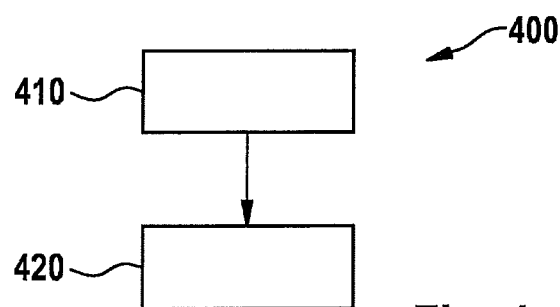
FIG. 4 shows a flow chart of one exemplary embodiment of the present invention as a method.

FIG. 4 shows a flow chart of one exemplary embodiment of the present invention as method 400 for ascertaining the presence of a structural separation between two lanes. This method has an input step 410 of a light signal from an optical sensor, the light signal representing a brightness, having a degree of reflection of light emitted by a headlight of the vehicle from an object and/or a sharpness of a boundary line of the light from the headlight on the illuminated object. Furthermore, the method includes a step 420 of determining a distance of the object from the vehicle by using the light signal to determine the position of the object in the surroundings of the vehicle.

The exemplary embodiments described here and illustrated in the figures have been selected only as examples. Different exemplary embodiments may be combined with one another completely or with respect to individual features. One exemplary embodiment may also be supplemented by features of another exemplary embodiment.

Furthermore, method steps according to the present invention may be carried out repeatedly and in a different order than that described here.

If one exemplary embodiment includes an "and/or" linkage between a first feature and a second feature, this is to be interpreted as meaning that the exemplary embodiment according to one specific embodiment has both the first feature and the second feature and according to another specific embodiment has either only the first feature or only the second feature.

What is claimed is:

1. A method for ascertaining a position of an object in surroundings of a vehicle, the method comprising:
   inputting a light signal from an optical sensor;
   determining a light distribution from the light signal;
   comparing the determined light distribution, affected by a reflection of light emitted by a headlight of the vehicle, to a stored expected light distribution of the headlight; and
   determining a position of the object relative to the vehicle based on a result of the comparison.

2. The method of claim 1, wherein in the input step an angle is also input, at which the light signal has been detected with respect to an orientation of the vehicle, the position of the object being determined by using the angle.

3. The method of claim 1, wherein the light signal includes a plurality of light signals, each of the plurality of lights signals corresponding to a respective different position of the object.

4. The method of claim 1, further comprising:
   detecting a structural infrastructure measure when a region in the direction of travel ahead of the vehicle has a greater brightness than would be expected without the presence of the structural infrastructure measure.

5. The method of claim 4, wherein the structural infrastructure measure is detected in the detecting when a distance from the object is determined in the position determination as being smaller than a predetermined safety margin.

6. The method of claim 4, wherein, in the detection step, the structural infrastructure measure is detected as being situated on the side of the vehicle on which the region having the greater than expected brightness has been detected.

7. The method of claim 4, further comprising:
adapting a light emission of the headlight of the vehicle and/or a light emission parameter for the light emission of light of the headlight of the vehicle when the structural infrastructure measure has been detected in the detecting.

8. The method of claim 1, wherein before the inputting, a triggering of a movement of at least one headlight is carried out, the triggering being carried out to pivot a light emission of light of the headlight of the vehicle in a direction which is essentially across the direction of travel of the vehicle.

9. The method of claim 1, further comprising:
outputting a warning signal when a distance of the object from the vehicle, determined as part of the position determination, is smaller than a warning distance.

10. The method of claim 1, further comprising:
providing intervention of a driver assistance system into the steering of the vehicle in response to a distance of the object from the vehicle determined as part of the position determination, the intervention being performed as part of at least one of a lane holding assistant, an assistance system for maintaining a distance from a preceding vehicle, an assistance system for monitoring a lateral approach to a boundary, a brake assistance system, and a parking assistance system.

11. A device for ascertaining a position of an object in surroundings of a vehicle, comprising:
processing circuitry; and
an interface by which the processing circuitry is configured to obtain a light signal from an optical sensor;
wherein the processing circuitry is configured to:
determine a light distribution from the light signal;
compare the determined light distribution, affected by a reflection of light emitted by a headlight of the vehicle, to a stored expected light distribution of the headlight; and
determine a position of the object relative to the vehicle based on a result of the comparison.

12. A non-transitory computer readable medium having a computer program, which is executable by a processor, the computer program comprising program code for ascertaining a position of an object in surroundings of a vehicle, by performing the following:
inputting a light signal from an optical sensor;
determining a light distribution from the light signal;
comparing the determined light distribution, affected by a reflection of light emitted by a headlight of the vehicle, to a stored expected light distribution of the headlight; and
determining a position of the object relative to the vehicle based on a result of the comparison.

13. The method of claim 1, further comprising:
responsive to the determined position, adjusting the headlights between a low beams setting and a high beams setting.

14. The method of claim 1, wherein the determining of the position of the object includes determining presence of a structural lane separator, the method further comprising:
prolonging the time for turning up the headlights from low beams to high beams in response to the determination of the presence of the structural lane separator.

15. The method of claim 1, wherein the comparison between the light distributions includes comparing brightness values.

16. The method of claim 1, wherein the comparison between the light distributions includes comparing sharpness values.

* * * * *